UNITED STATES PATENT OFFICE.

THOMAS LEOPOLD WILLSON AND MAXIMILIAN MATTHEUS HAFF, OF OTTAWA, ONTARIO, CANADA; SAID HAFF ASSIGNOR TO SAID WILLSON.

METHOD OF MANUFACTURING AN AMMONIUM SUPERPHOSPHATE FERTILIZER.

1,062,869.  Specification of Letters Patent.  Patented May 27, 1913.

No Drawing.  Application filed October 1, 1912. Serial No. 723,308.

*To all whom it may concern:*

Be it known that we, THOMAS LEOPOLD WILLSON and MAXIMILIAN MATTHEUS HAFF, subjects of the King of Great Britain, residing at the city of Ottawa, Province of Ontario, Dominion of Canada, have invented certain new and useful Improvements in Methods of Manufacturing Ammonium Superphosphate Fertilizer, of which the following is the specification.

This invention relates to a method of manufacturing an ammonium superphosphate fertilizer and the objects of the invention are to provide a simple and economical method by which ammonia may be fixed in a superphosphate fertilizer. When superphosphates are prepared by the ordinary method of adding sulfuric acid to natural phosphate rock an appreciable quantity of free acid remains as such. Incidentally, the sulfuric acid used forms with the lime in the rock phosphate a calcium sulfate.

We have found that if ammonia gas is introduced into the superphosphate that an absorption of the ammonia in the calcium sulfate takes place, thereby holding the ammonia as it were, in solid solution.

The feature of the present invention comprises mixing the superphosphate which has had ammonia introduced therein with a further quantity of the acid superphosphate. When the ordinary acid superphosphate has been freshly made about 40% of it may be mixed with the superphosphate prepared with ammonia as above described. Any free ammonia gas in the treated superphosphate is thus neutralized and absorbed by the freshly made superphosphate.

It will be readily appreciated that the process above described might be applied to other materials than superphosphate, thus the superphosphate which has been treated with ammonia gas might be mixed with any acid containing body, such as kieselguhr, containing an acid. The ammoniated superphosphate can also be treated with a gas containing small percentages of nitric oxid.

We may state that it is quite well known that when manure is spread over gypsum ammonia becomes absorbed therein and appears ultimately as ammonium sulfate by the inter-action of the carbon dioxid of the atmosphere.

What we claim as our invention is:

1. The herein described process which comprises introducing ammonia gas into a superphosphate and mixing the resultant mixture with an acid containing body.

2. The herein described method which comprises introducing ammonia gas into a superphosphate and then mixing a quantity of the resultant mixture with fresh superphosphate.

In witness whereof we have hereunto set our hands in the presence of two witnesses.

THOMAS LEOPOLD WILLSON.
MAXIMILIAN MATTHEUS HAFF.

Witnesses:
PEARLE M. GARROW,
M. MAHONEY.